United States Patent
Shelbourne et al.

Patent Number: 5,519,989
Date of Patent: May 28, 1996

[54] CROP STRIPPING APPARATUS

[75] Inventors: Keith H. Shelbourne, Pakenham; Paul J. McCredie, Monks Eleigh, both of England

[73] Assignee: Shelbourne Reynolds Engineering Ltd., Suffolk, England

[21] Appl. No.: 446,547

[22] Filed: May 19, 1995

Related U.S. Application Data

[63] Continuation of Ser. No. 165,722, Dec. 13, 1993, Pat. No. 5,419,107.

[30] Foreign Application Priority Data

Dec. 18, 1992 [GB] United Kingdom ............... 9226413

[51] Int. Cl.⁶ ............... A01D 45/00; A01D 45/02; A01D 45/04; A01D 45/24
[52] U.S. Cl. ............................... 56/130; 56/13.5
[58] Field of Search ............... 56/130, 13.5, 126, 56/364, 14.6, 16.5, 16.6

[56] References Cited

U.S. PATENT DOCUMENTS

| | | | |
|---|---|---|---|
| 4,015,410 | 4/1977 | Smith | 56/364 |
| 4,587,799 | 5/1986 | Thomas et al. | 56/126 X |
| 4,951,451 | 8/1990 | Klinner | 56/16.5 |
| 5,036,653 | 8/1991 | Klinner | 56/130 |
| 5,044,147 | 9/1991 | Klinner | 56/14.6 |
| 5,111,645 | 5/1992 | Klinner | 56/364 |
| 5,285,622 | 2/1994 | Klinner | 56/130 |
| 5,419,107 | 5/1995 | Shelbourne et al. | 56/130 |

FOREIGN PATENT DOCUMENTS

| | | | |
|---|---|---|---|
| 0241276 | 10/1987 | European Pat. Off. | A01D 47/00 |
| WO86/01972 | 4/1986 | WIPO | A01D 41/06 |

*Primary Examiner*—Stephen J. Novosad
*Attorney, Agent, or Firm*—Dennis T. Griggs

[57] ABSTRACT

Crop stripping apparatus is provided comprising a toothed crop-stripping drum and an auger for collecting crop stripped by the drum. Between the drum and the auger is a roller rotatable in the same direction as the drum. Behind and close to the outer peripheral surface of the roller a chute slopes downwards towards the auger at a progressively reducing angle. The spacing between the drum and the auger is greater than the expected length of detached plant stalks but is otherwise kept as small as possible for compactness. The roller serves to draw the plant stalks from the drum and urge them into the zone of action of the auger.

11 Claims, 2 Drawing Sheets

CROP STRIPPING APPARATUS

CROSS-REFERENCE TO RELATED APPLICATION

This is a continuation of application Ser. No. 08/165,722, filed Dec. 13, 1993 now U.S. Pat. No. 5,419,107.

FIELD OF THE INVENTION

This invention relates to crop strippers for detaching harvesting crops from standing plants. Such strippers are well known as a means of stripping grain from the heads of cereal crops such as wheat, barley, oats and rice but they can also be used to harvest crops such as peas, or to strip leaves, young shoots or blossom, for example, from the stems of crops.

BACKGROUND OF THE INVENTION

Apparatus of this type is known from U.S. Pat. No. 5,111,645, WO86/01972, EP 241276, WO88/04885 and WO88/05626 each of which the use of a toothed stripper drum to strip the portions to be harvested from the plants, the stripped material being fed to a conveying auger. These earlier disclosures all contain examples which suggest that the drum can feed the material directly to the auger or to a belt conveyor which in turn feeds the auger. In practice the former arrangement has not been found to be viable, however, and it is now conventional to interpose a belt conveyor between the stripper drum and the auger. In U.S. Pat. No. 5,11,645, for example, there are other proposals, such as the use of a smaller vaned rotor behind the stripper drum, the vanes of which are intended to impel separated crop parts rearwards.

While it is usually the aim to leave the plant stems on the ground and take only the crop being stripped, this is not always possible. If cereal plants have been laid by wind and rain, for example, it is found that a considerable part of the stalks is taken in by the stripper as well as the grain separated from the stalks.

That would not be a problem if the stalks can be passed safely through the harvesting apparatus but experiments have indicated that conventional crop strippers are able to cope with these conditions only by providing a belt conveyer between the stripping drum and the auger which transmits the stripped crop onwards for collection. Attempts to produce a more compact grain stripper by omitting the belt conveyer show that such an apparatus cannot cope when a significant part of a cereal crop has been laid flat.

This is partly because the grain gathered from a laid crop follows a different trajectory and tends to be spilt from the back of the stripper drum. Also, it is found that the weakened stalks can become trapped between the drum and the auger, hanging on the crop-collecting pan under the auger, where they block the free passage of the stripped crop through the auger. Eventually, this material, together with some of the crop is redeposited on the ground, and as a result there can be a significant loss of crop.

It is an object of the present invention to provide a new form of stripper apparatus that is capable of handling crops such as laid cereal crops with less risk of disturbance by stalks or stems drawn into the apparatus.

SUMMARY OF THE INVENTION

According to one aspect of the present invention, there is provided crop stripping apparatus comprising a toothed stripping drum and an auger for the onwards transport of material gathered by said drum, the drum and auger being rotatable in opposite directions about generally horizontal and parallel axes so that their swept paths are contained in parallel cylindrical envelopes, the spacing between tile auger and the path swept by the roots of the teeth of the drum being not substantially greater than the diameter of said path swept by the tooth roots, a roller rotatable in the same direction as the drum being mounted on a further parallel axis between drum and auger and below the axes of the drum and auger and a chute slopes downwardly from the roller towards the auger from an upper starting portion that lies close to an outer peripheral face to roller.

For most crops it will be appropriate to have said spacing set so that tile length of a common tangent between an upper region of the envelope swept by the stripper drum and a lower region of the envelope swept by the auger is not substantially greater than 1200 mm and preferably not less than 800 mm.

According to another aspect of the invention, there is provided crop stripping apparatus comprising a stripping drum and an auger spaced from the drum for the onwards transport of material gathered by said drum, the drum and auger being rotatable in opposite directions about parallel axis so that their swept paths are contained in parallel cylindrical envelopes, a parallel roller being disposed in the spacing between the drum and auger, the roller being provided with means to rotate it in the same direction as the stripper drum, and a chute between the roller and the auger extending from close to the external peripheral surface of the roller and sloping downwardly with a slope that reduces, towards the auger.

Preferably said roller is disposed wholly or substantially wholly below the plane containing the axes of rotation of the drum and auger.

BRIEF DESCRIPTION OF THE DRAWING

The accompanying schematic drawings show in FIGS. 1 and 2 longitudinal sectional views of crop stripping apparatus according to the invention.

DESCRIPTION OF THE PREFERRED EMBODIMENT

Figure 1:
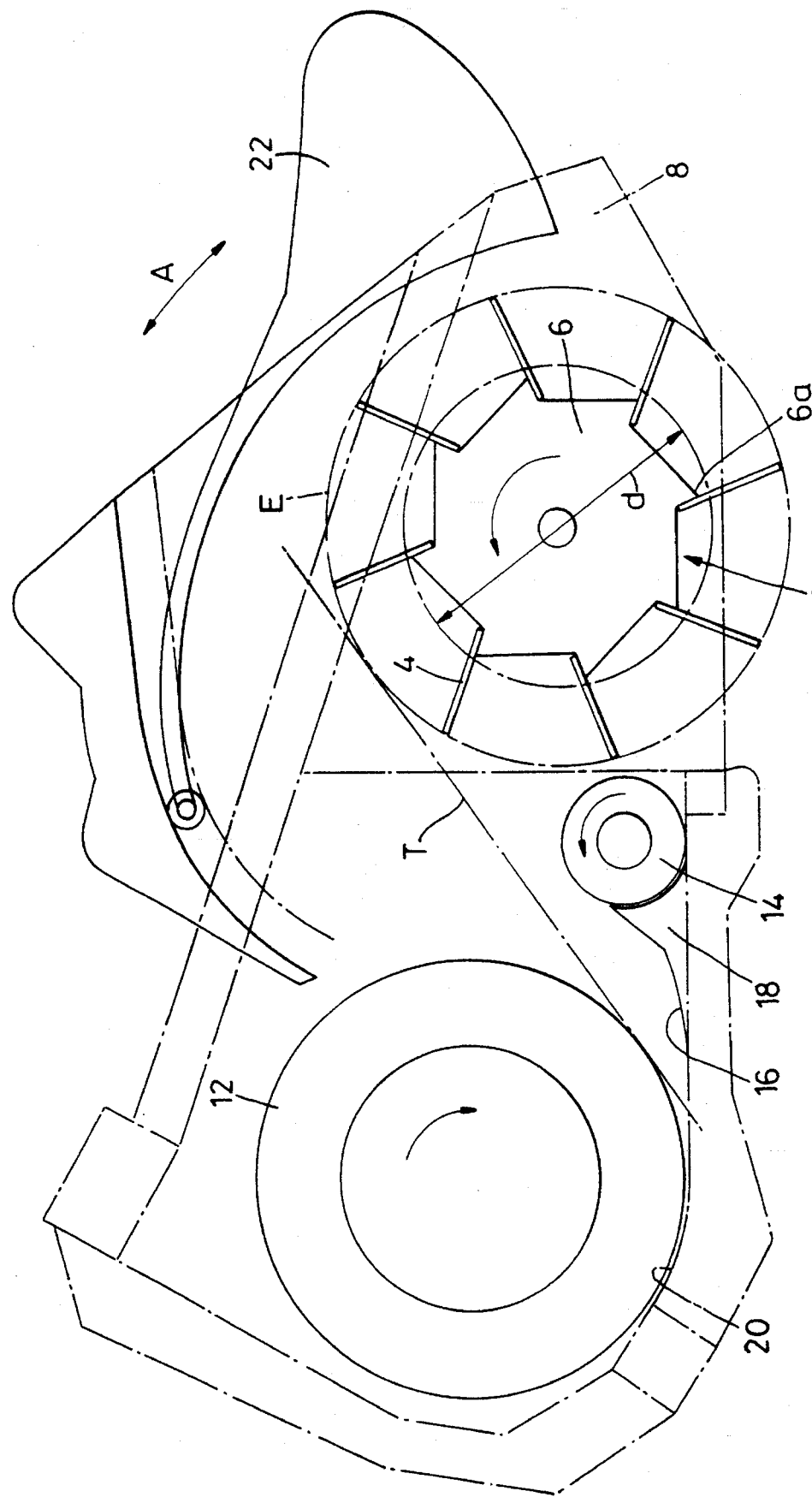

In known manner, the apparatus comprises a stripping drum 2 journalled in an outer casing 8 and having several series of parallel radial teeth 4 projecting generally radially from the periphery of the drum body 6. The teeth are mounted on steps of the drum body and the roots of the teeth are substantially coincident with the tops 6a of these steps. The drum is located near an open forward end of the casing 8 and rotates in an anti-clockwise direction as seen in the drawing so as to sweep the crop into the enclosure provided by the casing. As the stalks of, e.g. a cereal crop, are combed by the teeth 4, the grain is stripped from them and the drum also directs the grain or other stripped crop towards a collecting auger 12 mounted on a parallel axis in the casing and rotating in the opposite direction to deliver the crop to a collecting channel (not shown).

In contrast to conventional machines currently in operation the spacing between the auger and the roots of the drum teeth is slightly less than the diameter swept by the tooth roots. That spacing may be increased somewhat but is never substantially greater than the diameter d swept by the tooth roots and is preferably kept as small as possible. Within that spacing a smaller diameter roller 14 is mounted at the bottom of the casing 8 and is rotated on an axis parallel to the stripper drum axis and in the same direction as the stripper drum. The roller 14 is wholly disposed some distance below the plane that contains the axes of rotation of the stripping drum and auger.

The roller 14 is disposed immediately adjacent the drum. It can have a larger diameter than is shown, in which case it may project into the cylindrical envelope E of the teeth 4, then being grooved to clear the teeth. In general there are limits to the diameter of the roller because it should be kept low to allow the crop to clear the rotor, preferably being wholly between the plane containing the axes of the rotor and auger.

Between the roller and the auger, a downwardly inclined chute 16 formed by a fairing 18 which ensures that stalks will not be entrained by the roller to jam underneath it or be fed back to the stripping drum 2. As shown in FIG. 1, the chute extends from close to the external peripheral surface of the roller, there being only a running clearance between the roller and the fairing, to below the auger. The chute preferably has a generally concave form, ie. its slope decreasing rearwardly, to lead into pan 20 which underlies the auger, the vertical distance between the chute and the auger also decreasing rearwardly. The mean angle of slope the chute, ie. the inclination of the straight line joining the beginning and end of the chute, is preferably not substantially less than 25°.

The casing of the apparatus is provided, in known manner, with a front hood 22 that is adjustable in the direction indicated by the arrows A.

In operation, when gathering a grain crop, the rows of teeth 4 act in known manner to strip the grain from the plant stalks and to direct the stripped grain into the auger 12. The teeth may also pick up plant stalks or stems and these will tend to be held out from the stripper drum 2 by centrifugal force. At the descending, rear side of the drum 2 there is free space above the roller to the height of the stripper drum, so the stalks are brought down, into contact with the roller 14 which, because of its rotation, tends to draw the stalks from between the teeth of the drum. The roller then urges the stalks onto the auger from which they are collected separately from the stripped grain for disposal in known manner.

The spacing between the drum and the auger will depend to some extent on the length of stalk or stem of the crop being gathered. One pragmatic measure is to ensure that the length of said tangent is not substantially less than the expected length of stalk, which will generally be satisfied with a tooth root to auger distance not substantially greater than the distance across the tooth roots. In this way, it can be ensured that the stalks will not be held by the drum teeth and the auger before they come into contact with the roller 14. As another measure the common tangent plane T between the upper region of the swept envelope E of the drum and the lower region of the swept envelope of the auger (which corresponds to the outer diameter of the auger) has a length, as measured in a plane perpendicular to the axis of rotation of the drum and auger, slightly greater than tile maximum expected stalk length; for most crops a length between 800 mm and 1200 mm would be suitable.

The roller of course has the effect of urging the stalks into the zone of action of the auger and if driven at an appropriate speed it can release the engagement of the drum teeth with any of the stalks so that the stalks have been freed from the drum before they enter the auger. They can then be carried away by the auger to keep the entry to the auger free and so avoid obstruction of the flow of stripped crop into the auger. To intensify its action the roller can be provided with a gripping surface, e.g. with bristles or with toughening or other projections. Alternatively, it can be formed as an auger.

Figure 2:
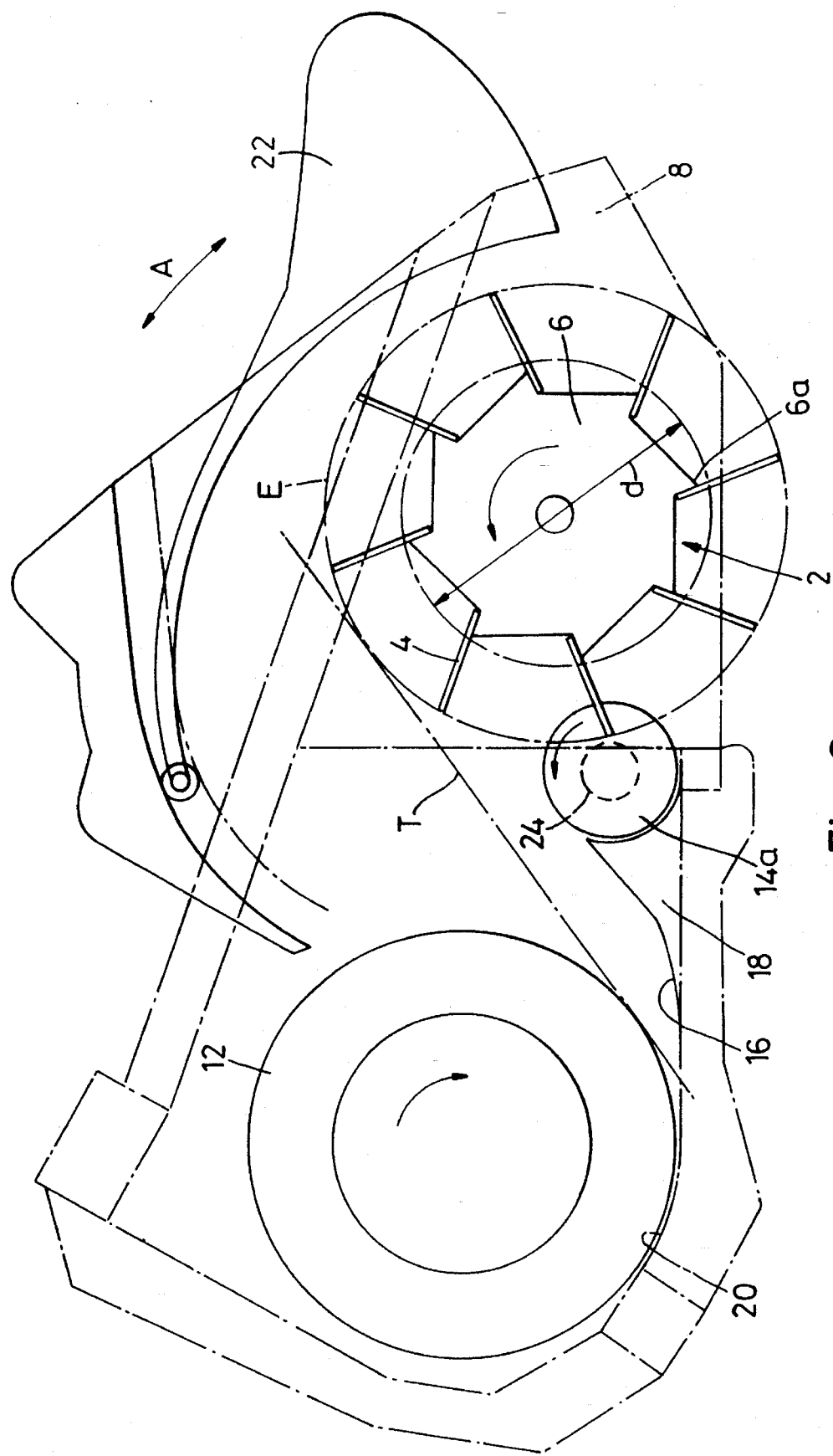

FIG. 2 illustrates a modified form of apparatus in which features already described with reference to FIG. 1 are given the same reference numbers. The intermediate roller 14a projects into the cylindrical envelope E of the stripping drum and has a series of circumferential grooves 24 providing clearance for the outwardly projecting teeth of the drum.

With the measures described the risk of ingested stalks and the like interfering with the operation of the apparatus can be considerably reduced. The apparatus thus offers the opportunity to have a more compact construction able to deal with laid crops, and moreover one that is simpler than the known stripper apparatus provided with a belt conveyer between drum and auger.

We claim:

1. Crop stripping apparatus comprising a toothed stripping drum rotatable about a first axis to sweep a first cylindrical envelope, and an auger rotatable oppositely to the drum about a second axis parallel to the first axis to sweep a second cylindrical envelope spaced from the first envelope, said stripping drum comprising a series of outwardly projecting teeth having roots at a diameter intermediate said first axis and said cylindrical envelope of the drum, said roots sweeping an inner cylindrical path, the auger being spaced from the drum at a distance from said inner cylindrical path not substantially greater than the diameter of said inner path, a roller mounted on a third axis parallel to the first and second axes and rotatable about said axis in the same direction as the drum, said roller being disposed below a plane containing said first and second axes, and a chute sloping downwardly from the roller towards the auger from an upper starting portion that lies close to an outer peripheral face of the roller.

2. Crop stripping apparatus according to claim 1 wherein the roller is at a spacing below a horizontal tangent plane from the top of the drum and a free space extends vertically from the top of the roller to said tangent plane.

3. Crop stripping apparatus according to claim 1 wherein said sloping chute extends below the auger.

4. Crop stripping apparatus according to claim 1 wherein said chute has a slope that is lesser further from the roller.

5. Crop stripping apparatus according to claim 1 where in the vertical distance between the chute and the auger decreases progressively with increasing distance from the roller.

6. Crop stripping apparatus according to claim 5 wherein the mean angle of slope of the chute is not substantially less than 25°.

7. Crop stripping apparatus comprising a stripping drum rotatable about a first axis to sweep a first cylindrical envelope, an auger spaced from the drum and rotatable oppositely to the drum about a second axis parallel to the first axis to sweep a second cylindrical envelope spaced from the first envelope, a roller disposed between the drum and auger and rotatable about a third axis parallel to the first and second axes, said roller being rotatable about its axis in the same direction as the drum, and a chute between the roller and the auger extending from close to the external peripheral surface of the roller and sloping downwardly towards the auger.

8. Crop stripping apparatus according to claim 7 wherein the roller is at a spacing below a horizontal tangent plane from the top of the drum and a free space extends vertically from the top of the roller to said tangent plane.

9. Crop stripping apparatus according to claim 7 wherein said sloping chute extends below the auger.

10. Crop stripping apparatus according to claim 7 wherein said chute has a slope that is lesser further from the roller.

11. Crop stripping apparatus according to claim 10 wherein the mean angle of slope of the chute is not substantially less than 25°.

* * * * *